US006820865B2

(12) United States Patent
Low

(10) Patent No.: US 6,820,865 B2
(45) Date of Patent: Nov. 23, 2004

(54) NOZZLE VALVE TYPE SPRAY DRYER

(76) Inventor: David Nicholson Low, 1425 Athens Rd., Wilmington, DE (US) 19803

( * ) Notice: Subject to any disclaimer, the term of this patent is extended or adjusted under 35 U.S.C. 154(b) by 0 days.

(21) Appl. No.: 10/347,427

(22) Filed: Jan. 21, 2003

(65) Prior Publication Data
US 2004/0145069 A1 Jul. 29, 2004

(51) Int. Cl.[7] .................................................. B01F 3/04
(52) U.S. Cl. ...................... 261/117; 159/4.04; 159/48.1
(58) Field of Search ........................... 261/62, 117, 115, 261/DIG. 9; 159/4.04, 4.2, 48.1

(56) References Cited

U.S. PATENT DOCUMENTS

| | | | | | |
|---|---|---|---|---|---|
| 816,371 | A | * | 3/1906 | Platz | 261/117 |
| 1,607,052 | A | * | 11/1926 | Brinkman | 261/53 |
| 1,798,166 | A | * | 3/1931 | Mensing | 568/735 |
| 2,578,199 | A | * | 12/1951 | Naab | 261/30 |
| 3,116,348 | A | * | 12/1963 | Walker | 261/44.1 |
| 3,163,498 | A | * | 12/1964 | Lisankie et al. | 422/207 |
| 3,544,086 | A | * | 12/1970 | Willett | 261/62 |
| 3,767,174 | A | * | 10/1973 | Heeney | 261/62 |
| 3,803,805 | A | * | 4/1974 | Low | 95/235 |
| 4,066,424 | A | * | 1/1978 | Kilgren et al. | 95/233 |
| 4,260,563 | A | * | 4/1981 | Brulhet | 261/23.1 |
| 4,374,813 | A | * | 2/1983 | Chen et al. | 423/243.08 |
| 4,400,184 | A | * | 8/1983 | Tomita et al. | 96/19 |
| 4,479,908 | A | * | 10/1984 | Arbeille et al. | 261/62 |
| 4,963,329 | A | * | 10/1990 | Burgess et al. | 422/168 |
| 5,512,097 | A | * | 4/1996 | Emmer | 106/745 |
| 5,695,614 | A | * | 12/1997 | Hording et al. | 203/10 |
| 6,419,210 | B1 | * | 7/2002 | Low | 261/62 |

FOREIGN PATENT DOCUMENTS

| | | | | |
|---|---|---|---|---|
| IT | 369588 | * | 3/1939 | 261/117 |

* cited by examiner

*Primary Examiner*—Richard L. Chiesa

(57) ABSTRACT

This method achieves spray drying by injection super heated slurry type material counter currently into a duct delivering preheated drying gas. Drying gas velocity is above flooding velocity, and the feed spray is delivered by a variable-flow nozzle valve which maintains constant kinetic energy per unit mass of spray over its flow range. Spray cone angle is also adjusted over the same flow range. Conventional facilities are used for heating drying gas and for collecting dried solids.

2 Claims, 2 Drawing Sheets

NOZZLE VALVE TYPE SPRAY DRYER

CROSS-REFERENCE TO RELATED APPLICATIONS

Application Ser. No. 09/690,861 Combined Spray Nozzle and Throttle Valve filed Oct. 8, 2000.

| Int. Cl. | B01F 3/4 |
|---|---|
| U.S. Cl. | 21/62; 261/117; 261/dig. 9 |

Reference cited: U.S. Pat. No. 6,419,210 B1

STATEMENT REGARDING FEDERALLY SPONSORED RESEARCH OR DEVELOPMENT

There has been no federally sponsored research or development in this application.

REFERENCE TO A MICROFICHE APPENDIX

Not applicable

BACKGROUND OF THE INVENTION

In many industrial operations a liquid slurry or solution of a product is used during its preparation. Then it is a common practice to remove the liquid, most often water, and ship only dry product to the customer. The customer may then use the product in its dry form, or he may reconstitute it with a suitable liquid. Common products so handled are instant coffee and powdered milk.

Figure 1:
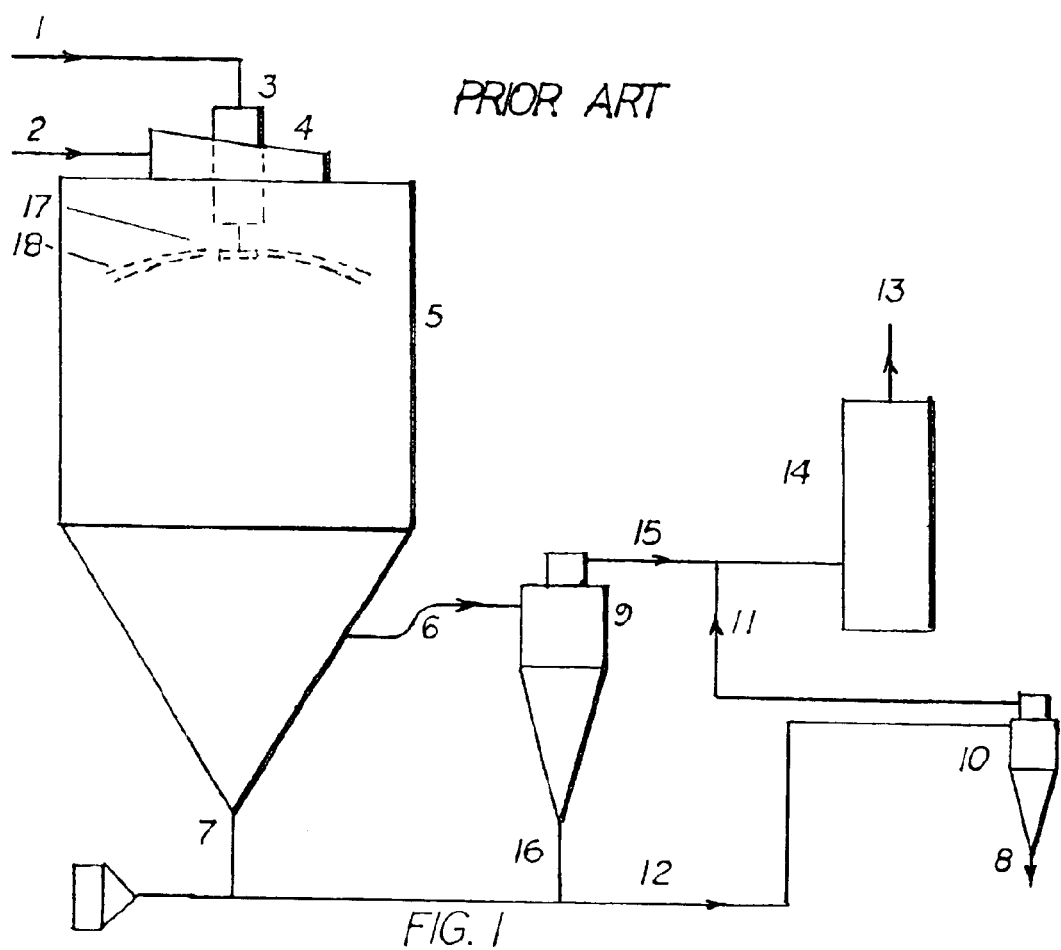
Figure 2:
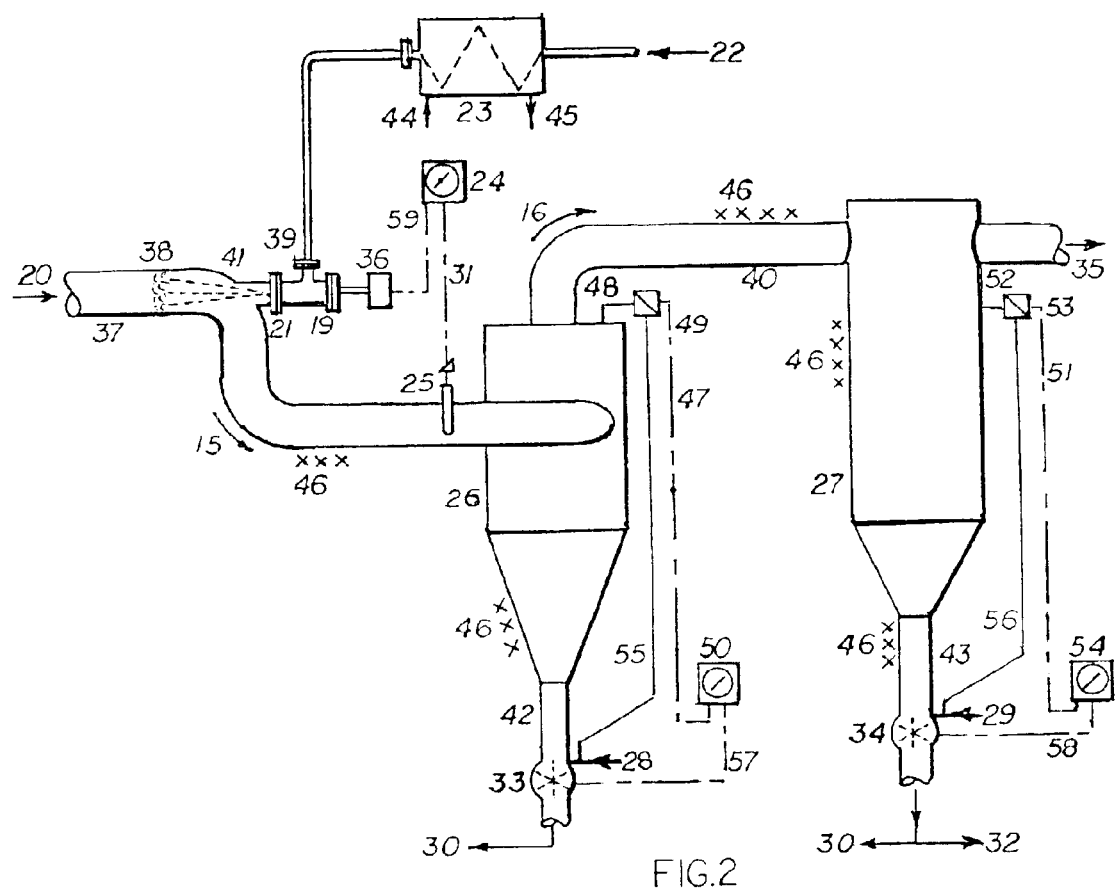

FIG. 1 shows a typical spray dryer system used industrially to remove liquid from a slurry or solution.

Feed stream 1 is a liquid carrying suspended or dissolved solids which is pumped on to a spinning disk 17 driven at high speed by a motor 3. This action of disk 17 results in atomization of stream 1 into fine droplets 18 within the body of a spray chamber 5. Although a spinning disk is the most common atomizer, other devices include a spray nozzle, two phase spray nozzles and high frequency devices.

A hot-arid drying-gas 2 is introduced through a manifold 4 which directs gas 2 downward into spray chamber 5 where it forms the surrounding atmosphere for droplets 18. As droplets 18 fall through drying gas 2 their liquid component is evaporated which leaves dry particles of product. Most of the dry product passes out of spray chamber 5 at a lower solids discharge 7. Fine particles of product are carried with the drying gas and water vapor through a gas outlet 6 to a cyclone separator 9.

Most remaining solids leave cyclone 9 at a cyclone solids outlet 16 where they join the bulk of collected solids from discharge 7 to form a solids product 12 passing to a final separator 10. Drying gas and water vapor 15 leaving cyclone 9 and carrying very few solids joins vent gas 11 from final separator 10. Both streams pass through a final scrubber or bag filter 14 before venting to a suitable release point 13. Solids leave separator 10 at an outlet 8.

Although FIG. 1 represents a general spray dryer design, there are many variations depending upon the material being processed and the desired product.

The spray dryer design shown by FIG. 1 is highly adaptable to many materials, and it is used widely in many industrial applications. However much of its cost lies in the large spray chamber which may also require a major investment in building space in addition to the spray chamber itself. Also the spray disk and its drive are expensive precision devices, since they often reach speeds in the range of 14,000 rpm. Electrical energy to power the disk is a continuing operating cost.

BRIEF SUMMARY OF THE INVENTION

This invention improves spray-drying equipment by simplifying it which results in savings in investment and in electrical operating cost. A contact zone in the duct used to convey hot gas 2 to manifold 4 and duct 2 itself are used to replace Spray chamber 5 in FIG. 1. A reversed jet nozzle valve described by U.S. Pat. No. 6,419,210 B1 and application Ser. No. 09/690,861 is used to replace spray disk 17 and its electric motor drive 3.

Heating equipment to supply hot-arid air to the dryer including its blower is essentially the same as for a conventional spray dryer. Also, the collection system is similar to that used by conventional spray dryers of the type that includes fluidized bed drying/stripping of residual moisture from the solids.

BRIEF DESCRIPTION OF THE SEVERAL VIEWS OF THE DRAWING

FIG. 1 is a schematic drawing of a typical conventional spray dryer. FIG. 1 is after a typical spray dryer system shown on page 4 of "SPRAY DRYING HANDBOOK", fifth edition by K. Masters.

FIG. 2 is a schematic drawing showing the proposed spray dryer design using a reversed-jet nozzle valve for atomization and without a spray chamber.

DETAILED DESCRIPTION OF THE INVENTION

In FIG. 2 a liquid feed stream 22 containing dissolved or suspended solids is pumped under pressure in the range of 50 psig. This pressure may be higher or lower depending upon stream 22's viscosity, abrasiveness, and the amount of heat or superheat needed at a contact zone 38. Stream 22 passes through an optional pre-heater 23 where the stream's temperature may be raised to include superheat above the atmospheric flash point of liquid stream 22. This superheat is particularly preferred when the solid product is difficult to dry, and it should be preferably used unless the high temperature degrades the final product. Feed stream 22 enters a nozzle valve 19 at a valve inlet 39. Nozzle valve 19 is attached to a flange 21 at an elbow in a duct 37. Nozzle valve 19 is axially aligned along the centrally located longitudinal axis of duct 37, and its spray 41 is countercurrent to a drying gas 20 flowing in duct 37. Feed stream 22 becomes a spray 41 directed into duct 37 at a rate determined by the degree of opening of nozzle valve 19 and the pressure (potential energy) of feed stream 22. Spray 41 is a narrow solid-cone type usually having an included angle of 20 degrees or less. It is a characteristic of nozzle valve 19 that its spray 41 has constant kinetic energy per unit weight of spray 41 over its useful turndown range of approximately six to one. Another characteristic of valve 19 is that the included angle of spray 41 will decrease slightly with decreasing flow of stream 22 so as to approximately maintain the penetration of spray 41 into gas 20 even though drop size in spray 41 decreases with decreasing flow. Nozzle valve 19 is described in detail by U.S. Pat. No. 6,419,210B1 and in application Ser. No. 09/690,861.

Previously heated drying gas 20 reaches the system through duct 37. Gas 20 should have a symmetrical velocity profile about a central longitudinal axis of duct 37 before gas 20 reaches contact zone 38. This symmetrical velocity profile can usually be achieved by twenty diameters of straight upstream duct length. However, the necessary length can vary depending upon the configuration of preceding duct work. Gas 20 is preheated to a temperature sufficient to vaporize liquid in stream 22 and in sufficient quantity to match the rate of stream 22. The velocity of gas 20 should be at least enough to cause a complete reversal of a counter current spray 41 in contact zone 38 where gas 20 meets spray 41 of stream 22. This reversal velocity for gas 20 will be in the range of 80 feet/sec. at temperatures and pressures normally encountered in a spray dryer where water is being evaporated with hot air. However, the required velocity of gas 20 can vary depending upon its density and the density of spray 41. Downstream of contact zone 38 a combined gas stream 15 should have a velocity in the range of 50 ft/sec. for the same spray dryer. This minimum velocity will also vary depending upon combined gas and water vapor density and the density of solids being conveyed.

Contact zone 38 results from the high-velocity counter-current collision of spray 41 at typically 70 to 80 feet per second with gas 20 also moving at a similar velocity in the opposite direction. At contact zone 38 the counter current collision causes droplets from spray 41 to shatter into smaller drops with an increase in surface area. This increased surface area leads to a rapid transfer of heat from gas 20 to droplets in spray 41. When stream 22 has been superheated above its atmospheric flash point, by for example ten degrees by pre heater 23, solids in feed stream 22 are above their final dry temperature before reaching contact zone 38. Also by this preheating, the task of transferring heat from drying gas 20 to a drying solid particle becomes less difficult. By superheating stream 22, spray 41 partially flashes as it leaves nozzle-valve 19. This flashing further reduces drop size with increased surface area for even more rapid evaporation of liquid in spray 41. The bulk of drying takes place in contact zone 38. However, removal of residual moisture continues in downstream solids recovery equipment.

Gas 20 combined with vaporized water and precipitated solids from stream 22 leaves contact zone 38 as a combined stream 15 in duct 37 before entering a cyclone 26. A temperature controller 24 senses gas temperature at a thermometer 25 through a signal line 31, and it positions nozzle valve 19 using a control line 59 and a valve operator 36. Controller 24 is set so as to reduce the flow of stream 22 if temperature at 25 drops to a pre determined low value which signals the danger of allowing wet solid material.

The following description of a solids recovery system is not unique to a nozzle valve spray dryer. It is included as an example of the general type of solids recovery area which includes fluidized bed stripping/drying that is preferred for this nozzle valve spray dryer. And it allows a visual comparison with an alternate recovery system as shown by FIG. 1.

Cyclone 26 separates gas and water vapor from stream 15 which then exit with very fine solids as a gas stream 16 through a duct 40. Most solids, separated from stream 15, leave cyclone 26 through a bottom down leg 42 and a rotary valve 33 in route to a solids discharge 30. As a preferred method of operation, a hot dry gas 28 should be introduced at the lower end of down leg 42 to form a fluidized bed dryer/stripper between rotary valve 33 and cyclone 26. This fluidized bed further reduces moisture in recovered solids and reduces the humidity of gas entrained with precipitated solids leaving rotary valve 33. A differential pressure transmitter 49 is used to measure bed level in down leg 42. A low pressure 48 is sensed at the top of cyclone 26. A high-pressure sensor line 55 joins dry gas connection 28 to sense pressure at the bottom of down leg 42. This differential pressure measurement is a direct function of fluid bed level in down leg 42, and this information is sent from transmitter 49 to a level controller 50 by a signal line 47. A controller 50, acting through a control line 57, regulates the speed of rotary valve 33 to maintain a desired fluid bed level in down leg 42.

Air, water vapor and residual fine solids make up gas stream 16 which enters a bag filter 27 through duct 40. Air and water vapor exit filter 27 at a gas outlet 35. Heat in outlet 35 may be recovered at some point such as a heat inlet line 44 for pre-heater 23 with a final vent 45 for example where feed stream 22 can be heated but not superheated. Solids removed from gas stream 16 by filter 27 collect in a down leg 43. Down leg 43 preferably should also employ a fluidized bed as a final drying/stripping step for difficult-to-dry solids. Similar to cyclone 26, a differential pressure transmitter 53 measures a low pressure 52 in filter 27 and a high pressure 56 at a hot dry-gas inlet 29 used to sustain a fluidized bed in down leg 43. Differential pressure, as a function of fluid bed level in down leg 43, is sent by a signal line 51 to a level controller 54. Controller 54, through a control line 58 adjusts the speed of a rotary valve 34 to maintain a desired fluidized bed level in down leg 43. Solids leaving valve 34 may exit to join duct 30 as product, or they may exit at a duct 32 for recycle.

All recovery system surfaces 46 should be insulated and heated if necessary to maintain these surfaces safely above the dew point of stream 15. Residual drying of solid particles continues in this downstream equipment.

Additional equipment may be added at inlet 39 to facilitate operation of nozzle-valve 19. These additions are convenient for operation, but they are not essential for a nozzle-valve type spray dryer. These additions are a block-and-bleed valve system to assure valve 19's isolation when needed, a recycle line for returning slurry to its make-up tank, and liquid and gas purge lines for clean out use.

Heat and mass calculations for a nozzle valve dryer are similar to those for a conventional dryer. However, a velocity calculation for spray 41 and a pressure drop calculation for contact zone 38 are unique to a nozzle valve dryer. A sample design problem is given below for the area around spray 41 and contact zone 38 in FIG. 2.

Assume:

Feed stream 22=Water based, 3 gpm, 35% solids and 1.1 s.g. Dry solids having low porosity and specific heat=0.2.

Valve inlet 39=50 psig, 138 C. (280 deg. F.)

Gas velocity at combined stream 15=greater than 50 feet/sec.

Estimated partial pressure of water vapor at combined stream 15=3 psia.

Hot gas 20=350 C. (662 F.) Combined gas at 15=95 C. (203 F)

Assume dryer pressure at one atmosphere.

Ignore: Inlet water vapor, outlet solids volume and dryer heat loss.

Velocity of spray 41:

V=sq.rt. 2 gh where V=ft./sec., g=32.2 ft./sec./sec, h=ft. head at inlet 39

V sq.rt. (2×32.2×50 psi×2.3 ft.water/psi×1.0 sg/1.1 s.g.)

V=82. ft./sec.

Content of feed stream 22 at valve inlet 39:

Total feed=3 gpm×8.337 pounds/gal.×1.1 s.g.×1 minute/60 sec.=0.4585 pounds/sec.

Solids feed=0.35×0.4585=0.1605 pounds/sec.

Water feed=0.65×0.4583=0.298 pounds/sec.

Water feed=0.298 pounds/sec./18 pounds water/pound mole=0.0166 moles/sec.

Heat needed from drying gas 20:

Enthalpy of water at 280 F. and 50 psig.=249 B.T.U./pound

Enthalpy of water vapor at 203 F. and 3 psia.=1150 B.T.U./pound

Heat lost from solid in cooling from 280 F. to 203 F.=(280 F.–203 F.)×0.2 specific heat=15.4 B.T.U./pound Heat needed from gas 22=0.298 pounds water/sec×(1150–249)B.T.U./pound-0.16 pounds solid/sec.×15.4 B.T.U./pound=266 B.T.U./sec=958,000 B.T.U./hr.

Pounds/hr. of dry gas 20 cooled from 662 F. to 203 F. to supply 958,000 B.T.U./hr.:

B.T.U./hr=Pounds of gas 20/hr×specific heat gas 20×change in F.

Pounds of 20/hr=(958,000 B.T.U./hr)/0.24 specific heat×(662 F.–203 F.)

Pounds of gas 20/hr.=8,690.

Pound moles of gas 20/hr=8,690/29 pounds air/pound mole=300

Pound moles of gas 20/sec.=300 moles/hr×1/3600 sec./hr.=0.08327

Volume of gas 20 at 350 C. (662 F.) Assume 358.9 cuft/pound mole

Cuft/hr=358.9 cuft/mole×(273 C.+350 C.)/273 C.×300 moles/hr

Cuft/hr=245,500=68. cuft/sec.

Volume of combined gas stream 15 at 95 C. (203 F.):

$$\begin{aligned}\text{Total volume} &= \text{volume of gas 20 plus volume of water vapor from spray 41}\\ &= .08327 \text{ moles gas } 20 + .01605 \text{ moles water}\\ &= .09932 \text{ moles/sec.}\\ &= .09932 \text{ moles/sec} \times 358.9 \text{ cuft/mole} \times (95\text{ C.}+273\text{ C.})/273\text{ C.}\\ &= 48.\text{ cuft/sec.}\end{aligned}$$

Diameter of Duct 37 at stream 15:

Assume 12 inside diameter=0.7854 sq.ft.

Velocity of combined stream 15:

Velocity of stream 15=48 cuft/sec./0.7854 sq.ft=61 ft/sec.

Velocity of gas 20:

Velocity of gas 20=68. cuft/sec/0.7854 sq.ft.=86.5 ft/sec.

Pressure drop across contact zone 38:

Pressure drop across zone 38 is equal to the force needed to decelerate spray 41.

F=W/g×A Where F=pounds force, W=pounds/sec., A=ft/sec

F=0.298 pounds/sec water/32.2 ft/sec/sec×(82+61) ft/sec+0.1605 pounds solid/sec 32.2 ft/sec/sec×(82+30) ft/sec.=1.88 pounds force Pressure drop across zone 38=1.88 pounds/0.7854 sqft.=2.4 pounds/sqft.

Inches of water=2.4 pounds/sqft/62.4 pounds/sqft×12 inches water/ft.=0.46 inches of water The velocity of gas 20 has nil effect on pressure drop across contact zone 38 as long as its velocity is sufficient to cause complete reversal of spray 41.

What is claimed is:

1. A process for spray drying whereby a preheated sire of feed material containing liquid and solids is pressure sprayed at constant kinetic energy and near constant spray cone angle from an axially-aligned reversed jet counter currently into a duct conveying a pre heated drying gas to a spray dryer, said reversed jet and said duct having a common centrally-located longitudinal axis, said drying gas having sufficient velocity to completely reverse said spray at a contact zone in said duct and convey dry precipitated said solids to solids recovery equipment said duct comprising a straight approach section, an elbow, and an outlet means directing gas and dry solids to said solids recovery equipment.

2. A process for spray drying whereby a preheated stream of feed material containing liquid and solids is pressure sprayed at constant kinetic energy and near constant spray cone angle from an axially-aligned reversed jet counter currently into a duct conveying a pre heated drying gas to a spray dryer, said reversed jet and said duct having a common centrally-located longitudinal axis, said drying gas having sufficient velocity to completely reverse said spray at a contact zone in said duct and convey dry precipitated said solids to solids recovery equipment, and further comprising:

(a) a hot drying gas conveyed in a duct comprising a straight approach section, an elbow and an outlet means directing gas and dry solids to a solids recovery means, said elbow comprising a mounting means for attaching a flow adjustable spray m axis aimed concentrically and counter current to said drying gas straight approach section;

(b) said hot drying gas having a velocity of at least flooding velocity;

(c) a heater means for heating and super heating said liquid mixture;

(d) a pressure means for supplying said liquid mixture through pipes to said heater and to said spray means;

(e) said flow adjustable spray means being attached to said elbow mounting means; said spray nozzle providing constant kinetic energy per unit weight of sprayed material over its adjustable flow range, said spray nozzle providing a near constant spray cone angle over its flow range, (f) a liquid flush means attached to the inlet of said spray means for flushing said spray means and said spray dryer;

(g) a recycle means for circulating said solids and liquid mixture from inlet of said spray means to said liquid mixture's source;

(h) a contact zone in said hot gas duct at the confluence of said hot gas and said liquid spray from said spray means;

(i) a temperature measuring means in said duct to determine solids and gas temperature leaving said contact zone;

(j) a control means for regulating contact zone outlet temperature by adjusting open area of said spray means which determines feed mixture flow;

(k) a separator means directing most solids to its down leg and gas to its top outlet;

(l) a purged solids removal means for removal of most solids from said separator means;

(m) a high efficiency separator means for directing remaining solid particles to its down leg and gas to a vent;

(n) a purged solids removal means for removal of remaining solids from said high efficiency separator means.

* * * * *